United States Patent [19]

Owen et al.

[11] Patent Number: 4,991,918
[45] Date of Patent: Feb. 12, 1991

[54] LIGHT COLLECTOR FOR STIMULABLE PHOSPHOR IMAGING APPARATUS

[75] Inventors: James F. Owen; Robert W. Kulpinski; William F. Garbe; John C. Boutet, all of Rochester; Anthony R. Lubinsky, Webster; David Kessler; Nea Y. Woo, both of Rochester, all of N.Y.

[73] Assignee: Eastman Kodak Company, Rochester, N.Y.

[21] Appl. No.: 460,837

[22] Filed: Mar. 3, 1988

[51] Int. Cl.$^5$ .......................... B29D 11/00; G02B 6/00
[52] U.S. Cl. ................................ 350/96.10; 250/327.2; 264/1.5; 350/96.24
[58] Field of Search ................ 264/1.5; 250/327.2 A, 250/327.2 B, 327.2 C, 327.2 D, 327.2 L, 484.1 R, 484.1 B; 350/96.10, 96.24, 96.25, 96.27

[56] References Cited

U.S. PATENT DOCUMENTS

| | | | |
|---|---|---|---|
| 3,282,666 | 11/1966 | Gallagher et al. | 350/96.24 X |
| 4,170,400 | 10/1979 | Bach et al. | 350/96.25 |
| 4,222,630 | 9/1980 | Delignieres | 350/96.24 |
| 4,346,295 | 8/1982 | Tanaka et al. | 350/96.1 X |
| 4,409,477 | 10/1983 | Carl | 250/227.26 |
| 4,485,302 | 11/1984 | Tanaka et al. | 350/96.1 X |
| 4,636,641 | 1/1987 | Mori et al. | 250/327.2 |
| 4,749,861 | 6/1988 | Watanabe | 250/327.2 |

FOREIGN PATENT DOCUMENTS 0144856 6/1985 European Pat. Off. ...... 250/327.2 D
55-88005 7/1980 Japan .

Primary Examiner—John D. Lee
Attorney, Agent, or Firm—Thomas H. Close

[57] ABSTRACT

Light collectors formed by rolling one edge of a sheet of transparent thermoplastic material into an annular configuration, while keeping an opposite edge flat suffer from light collection inefficiency caused by local stretching and thus thinning of the sheet near the annular end, thereby increasing the number of internal reflections experienced by a light ray. This problem is solved by making a light collector that is uniform in thickness, or thicker toward the annular end.

4 Claims, 5 Drawing Sheets

LIGHT COLLECTOR FOR STIMULABLE PHOSPHOR IMAGING APPARATUS

TECHNICAL FIELD

This invention relates to light collectors for stimulable phosphor imaging apparatus and more particularly to such light collectors comprising a sheet of transparent material.

DESCRIPTION TO THE PRIOR ART

U.S. Pat. No. 4,346,295 issued Aug. 24, 1982 to Tanaka et al. discloses a stimulable phosphor radiation image readout apparatus having a light collector 10 as shown in FIG. 2 comprising a transparent sheet having a linear end 12 arranged adjacent a scan line 14, on a stimulable phosphor sheet 16 and an annular end 18 arranged at the face of a light detector such as a photomultiplier tube 20. Emitted light entering the linear end of the light collector is directed by total internal reflection within the light collector to the light detector. The light collector is formed by heating a sheet of thermoplastic resin in an oven while holding one edge of the sheet in a fixture. After heating to a temperature where the thermoplastic is pliable, the other end of the sheet is formed by hand into a substantially cylindrical output end having a cylindrical axis 21 normal to the output face of the collector. The annular end is held in a collar (not shown) while cooling, then it is cut off, squared, ground, and polished. A problem arises when forming a light collector in this manner, for when the cylindrical output end is formed, the thermoplastic sheet undergoes some stretching and is thereby thinned in regions 22 near the output end. The thinning in the sheet has a deleterious effect on the light collection efficiency of the light collector. This effect is explained with reference to FIGS. 3 *a,* and *b,* where a cross section of a tapered light collector 24 and a untapered light collector 26 are shown respectively. It is noted that each time a light ray 28 undergoes an internal reflection in the light collector, a small portion of the light is lost. In theory, the internal reflection is "total" if the surface of the collector is optically perfect; in practice this is difficult or impossible to achieve. Furthermore, there are also higher absorption losses due to a longer optical path through the transparent collector when the light experiences more reflections. Therefore, to maximize the light collection efficiency of the light collector it is desirable to minimize the number of internal reflections experienced by a light ray on its path to the detector FIG. 3a shows a light ray 28 entering a tapered light collector 24. The tapered light collector is thicker at the entrance end and thinner at the exit end. As the light ray 28 progresses through the light collector, the angles of reflection $\Theta_1, \Theta_2 \ldots$ from the surface of the light collector progressively increase due to the taper, thereby causing the light ray 28 to experience more and more reflections between the surfaces of the collector and consequently to traverse a longer path in the collector. FIG. 3b shows a light collector 26 with no taper. It is readily seen by comparing FIG. 3a and FIG. 3b that the number of reflections of the light ray 28 in the non tapered collector is less than in the tapered collector. It is the object of the present invention to provide a light collector of the type discussed above, having improved light collection efficiency.

DISCLOSURE OF THE INVENTION

The light collector according to the present invention is characterized by having a thickness that is constant or increasing from the linear input edge to the annular output edge, thereby minimizing the number of internal reflections experienced by a ray of collected light in its path through the light collector. In a preferred mode of practicing the invention, the light collector is formed by heating a rectangular sheet of thermoplastic material and forming the sheet on a mold that comprises a triangular section, with two half circular cylinders arranged along two edges of the triangular section such that the surfaces of the half circular cylinders are tangent to the surface of the triangular section. When the sheet is formed on such a mold, there is no localized stretching of the sheet, and hence no thinning near the annular end of the sheet. According to an alternative mode of practicing the invention, a rectangular wedge shaped sheet of thermoplastic material is formed on the mold, with the thin end of the wedge shaped sheet arranged along the base of the triangle section of the mold and the thick end of the wedge forming the annular end of the collector. In a further mode of practicing the invention, a wedge shaped light collector is formed by injection molding a thermoplastic material.

MODES OF CARRYING OUT THE INVENTION

Figure 2:
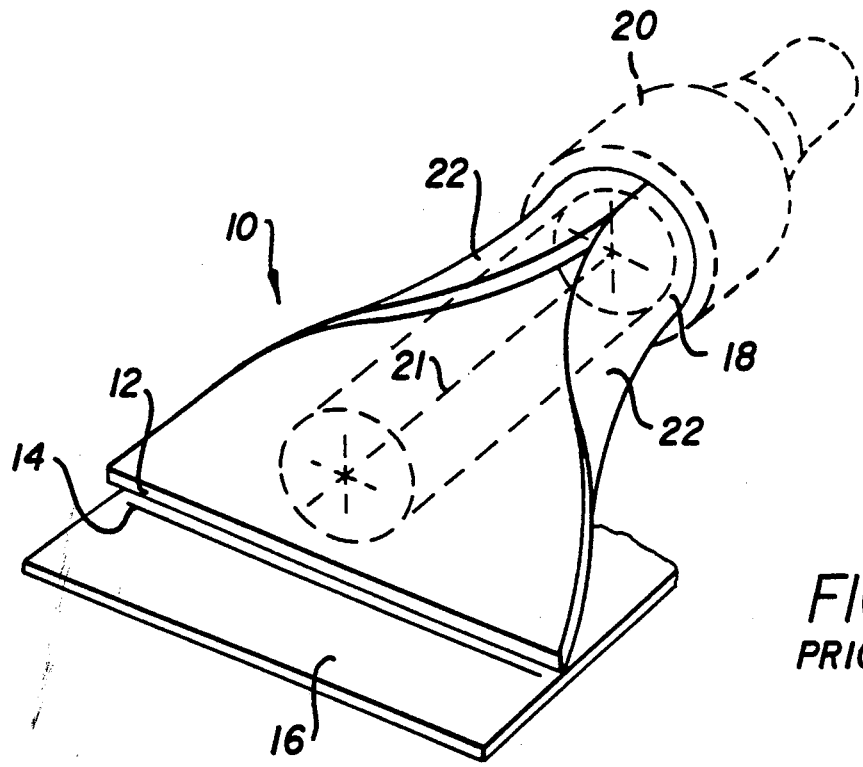
FIG. 2 is a perspective view of a light collector according to the prior art.
Figure 1:
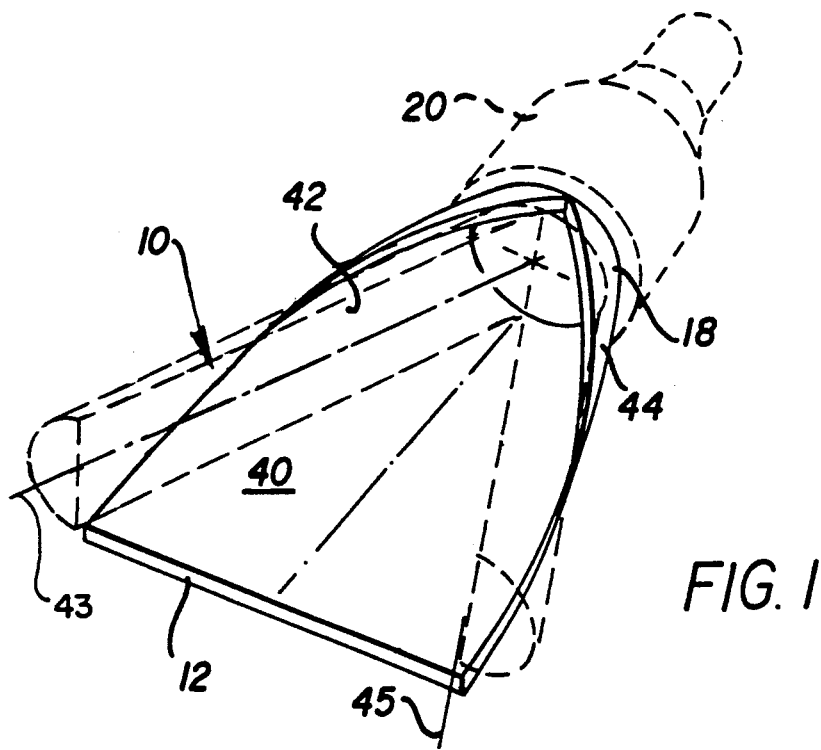
FIG. 1 is a perspective view of a light collector according to the present invention.

Referring to FIG. 1a light collector having improved light collection efficiency according to the present invention is shown. The light collector 10 is formed such that it is of constant thickness from the input edge 12 to the output edge 18, thereby improving light collection efficiency by reducing the number of total internal reflections experienced by rays of light within the collector. To achieve the uniform thickness, the light collector shown in FIG. 1 was formed as described with reference to FIG. 4. A sheet of transparent thermoplastic material 30 was clamped in a mold 32 having a plane triangular section 34 with two one half circular cylinders 36 and 38 arranged along two sides of the triangular section 34, such that the surfaces of the half cylinders were tangent to the surfaces of the triangular section. The mold 32 is constructed of optically polished stainless steel. One edge 12 of the sheet of transparent material which will become the input edge of the light collector is clamped along the base of the triangular section 34 of the mold. The assembly is heated in an oven until the thermoplastic sheet 30 is pliable, and the unclamped end of the sheet is formed around the half cylinders 36 and 38. The sheet is held around the cylinders until cooled when the mold 32 is removed.

The annular end of the sheet is then ground flat and polished as in the prior art. By thus forming the thermoplastic sheet around a mold having two half circular cylinders arranged along the edges of and tangent to a triangular section, the sheet is not stretched during forming, and therefore retains a uniform thickness throughout. The resulting light collector as shown in FIG. 1 has a flat triangular section 40 and two cylindrical sections 42 and 44 having cylindrical axes 43 and 45 respectively that are parallel to the edges of the triangular section and intersect at the face of the detector 20.

In practice the light collector 10 is arranged in optical contact with the face of the PMT 20, and a filter (not shown) for absorbing stimulating radiation is located over the face of the PMT 20. Furthermore, as is known in the prior art, an elongated mirror (not shown) can be placed opposite to the light input edge 12 to increase collection efficiency, and as is disclosed in U.S. Patent application Ser. No. 048,152 filed May 11, 1987 by J. F. Owen et al., the angle between the light collecting edge 12 and the perpendicular to the surface of the phosphor sheet can be arranged to be between 10° and 15° to optimize light collection and minimize flare.

Figure 5:
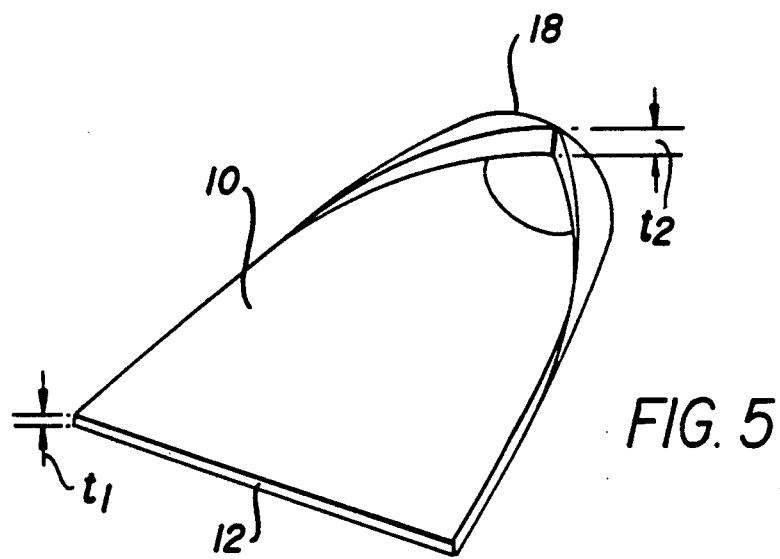
FIG. 5 is a perspective view of a further improved light collector according to the present invention prepared according to the steps illustrated in FIG. 4.
Figure 3A:
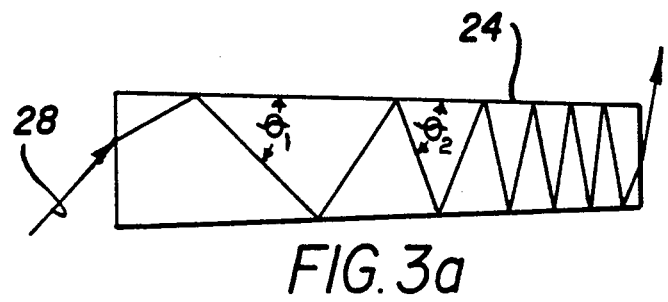
FIG. 3a-c are diagrams useful in describing the present invention.
Figure 3B:
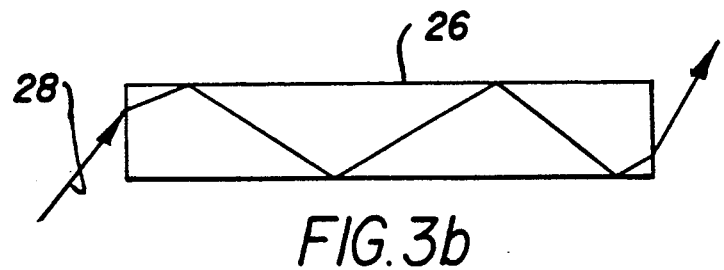
Figure 3C:
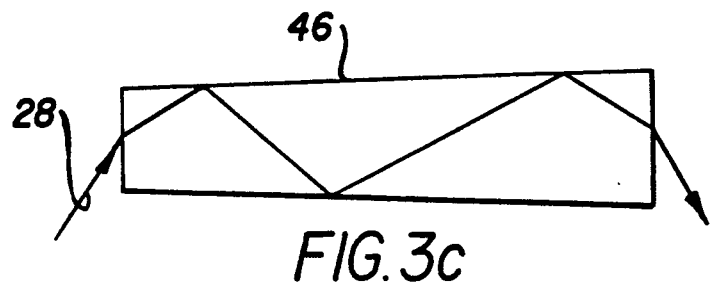
Figure 4:
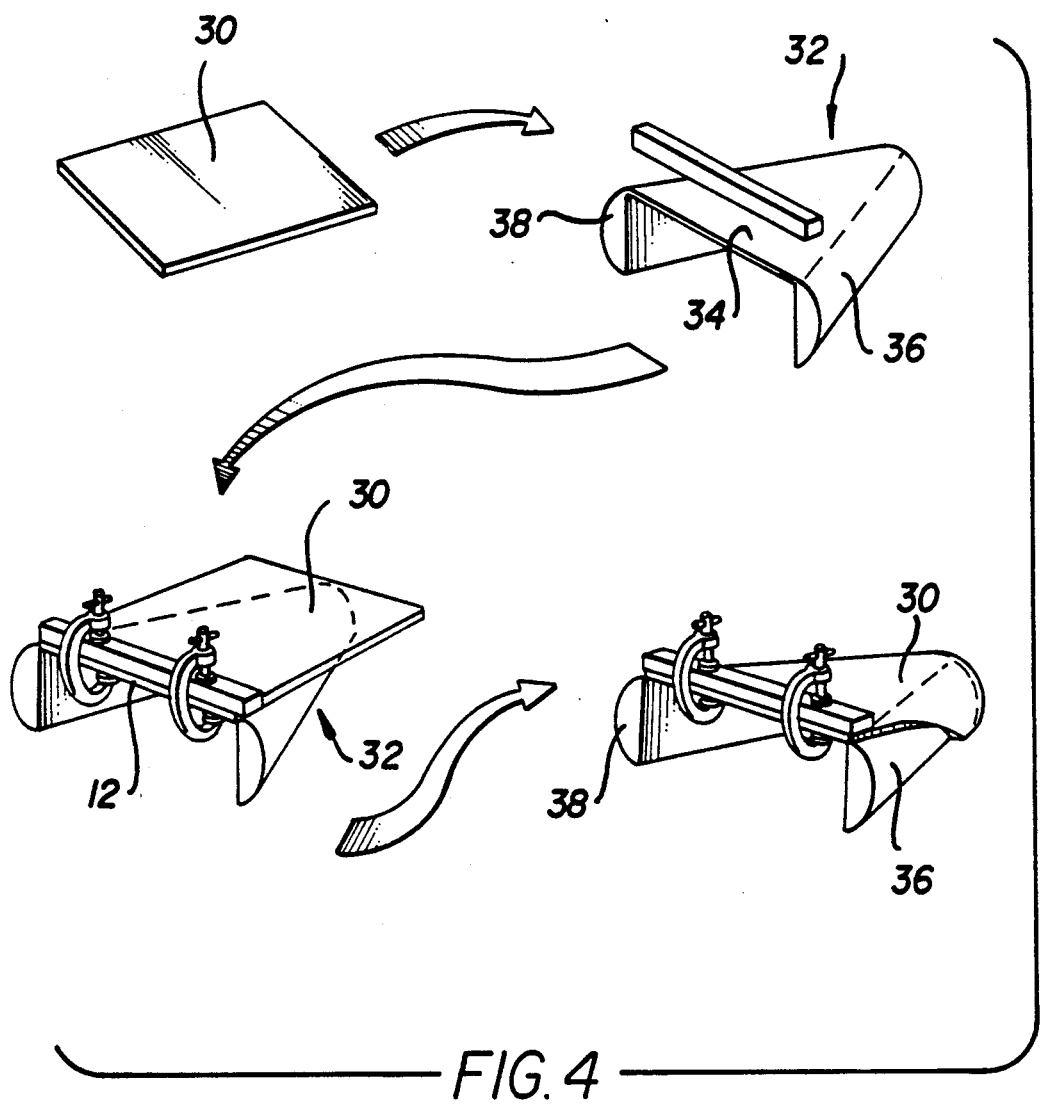
FIG. 4 is a schematic diagram showing steps of making the light collector of FIG. 1.
Figure 6:
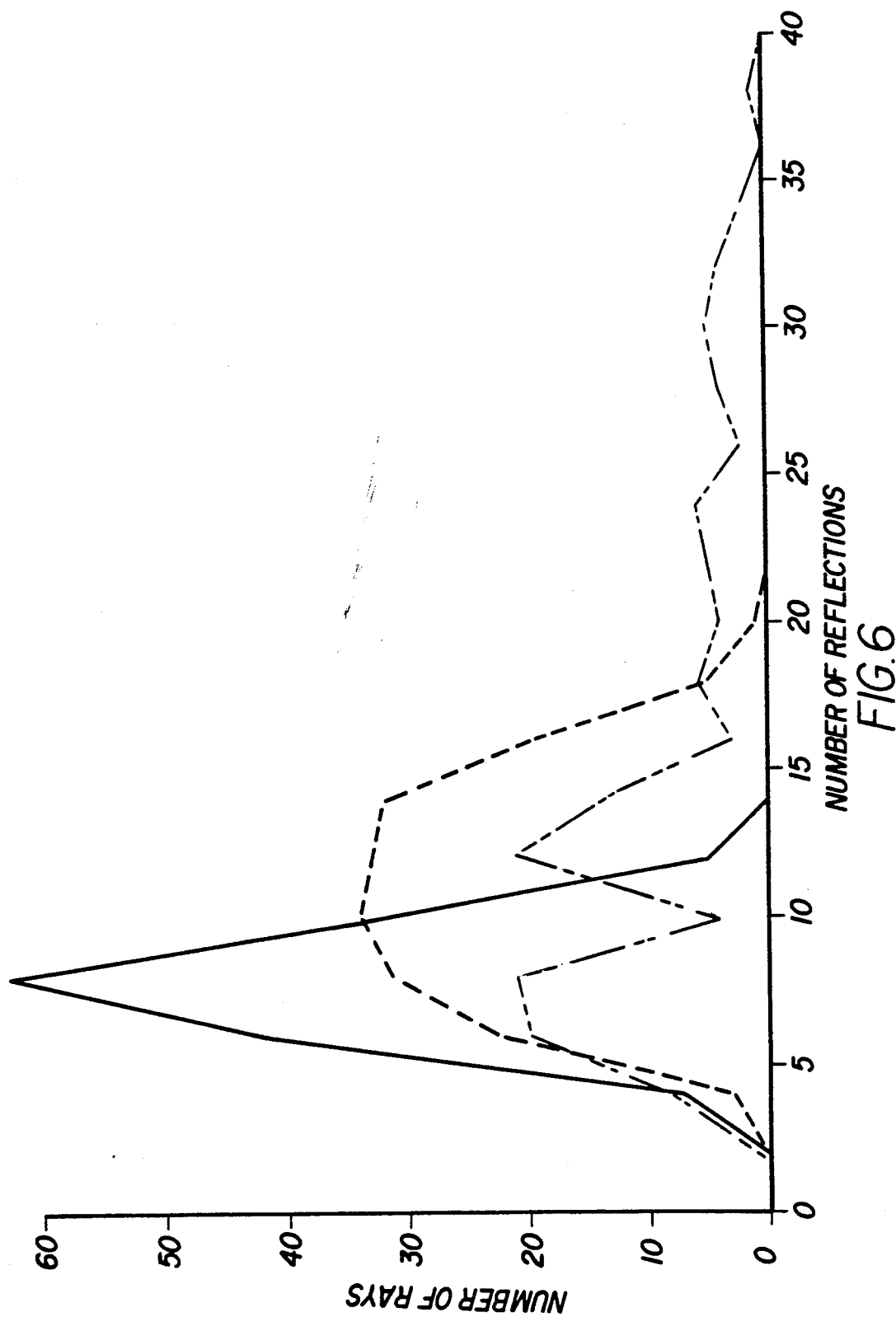
FIG. 6 shows histograms of the number of total internal reflections from light collectors according to the present invention.

In a further improvement of the present invention, the light collector is tapered in thickness from the input edge to the output edge, with the thicker edge being the output edge. FIG. 3c shows the effect on a ray 28 proceeding through a light collector 46 that is thicker at the output edge than the input edge. As can be seen by comparing FIG. 3c with FIG. 3b, the ray 28 in FIG. 3c experiences fewer internal reflections on its path through the light collector. A light collector according to the present invention wherein the thickness of the light collector increases from the input end to the exit end of the light collector can be constructed as shown in FIG. 4, starting with a wedge shaped sheet of thermoplastic material. The thin edge of the sheet is clamped in the mold and the thick end is wrapped around the one-half cylinders after heating. The resulting light collector is shown in FIG. 5. As shown in FIG. 5, the thickness $t_1$ of the input edge 12 is less than the thickness $t_2$ of the output edge 18. To evaluate the effect of increasing the thickness of the light collector from input edge to output edge, a computer model of the light collector shown in FIG. 5 was generated, and hundreds of rays were traced through the model. FIG. 6 is a histogram generated from the ray tracing experiment, which shows the relative number of rays experiencing different numbers of reflections in passing through a uniformly thick light collector and tapered light collectors according to the present invention. The chain line in FIG. 6 is the histogram for a uniformly thick light collector that is 0.6 cm thick. The dashed line is the histogram for a tapered light collector that is 0.6 cm thick at the entrance edge and 1.3 cm thick at the exit edge. The solid is the histogram for a light collector that is 0.6 cm thick at the entrance edge and 2.5 cm thick at the exit edge. It can be seen from FIG. 6 that the greater the taper in thickness, the fewer reflections the average ray experiences in passing through the collector and hence the greater the light collection efficiency.

Figure 7A:
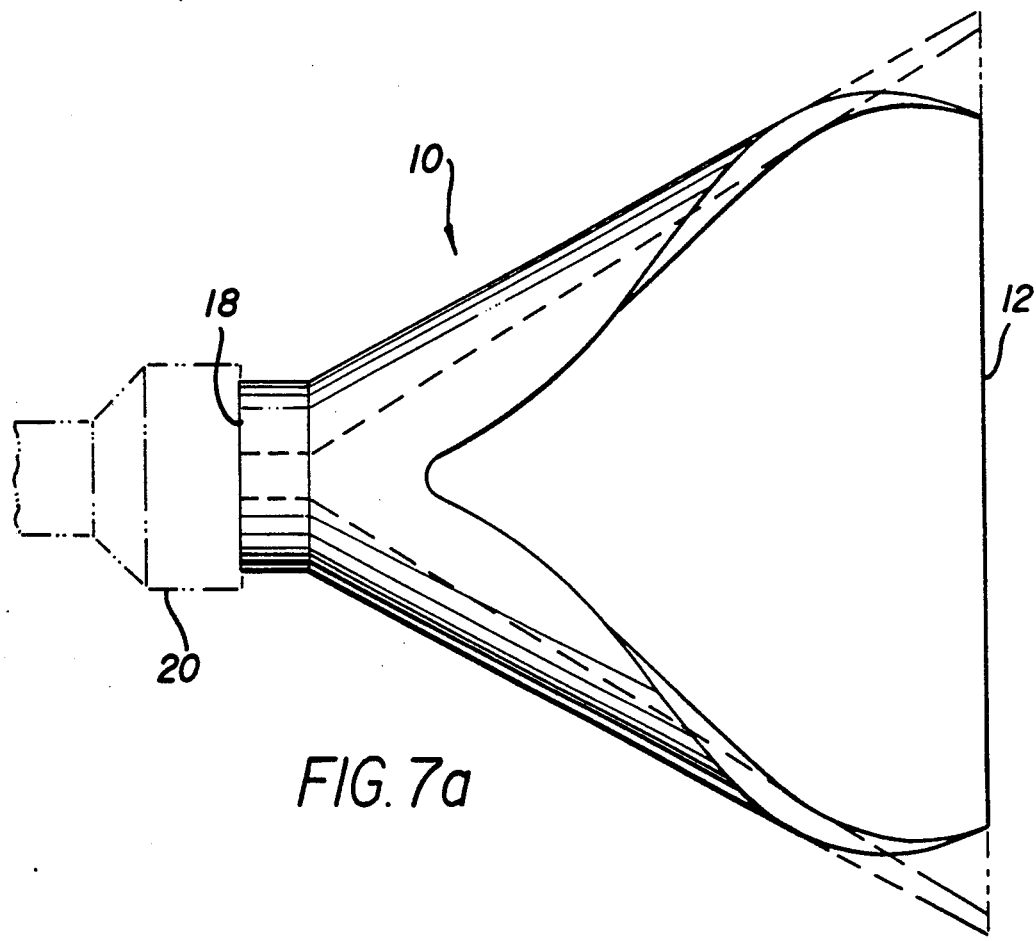
FIG. 7 *a* and *b* are top and side views respectively of a light collector according to the present invention prepared by injection molding.
Figure 7B:
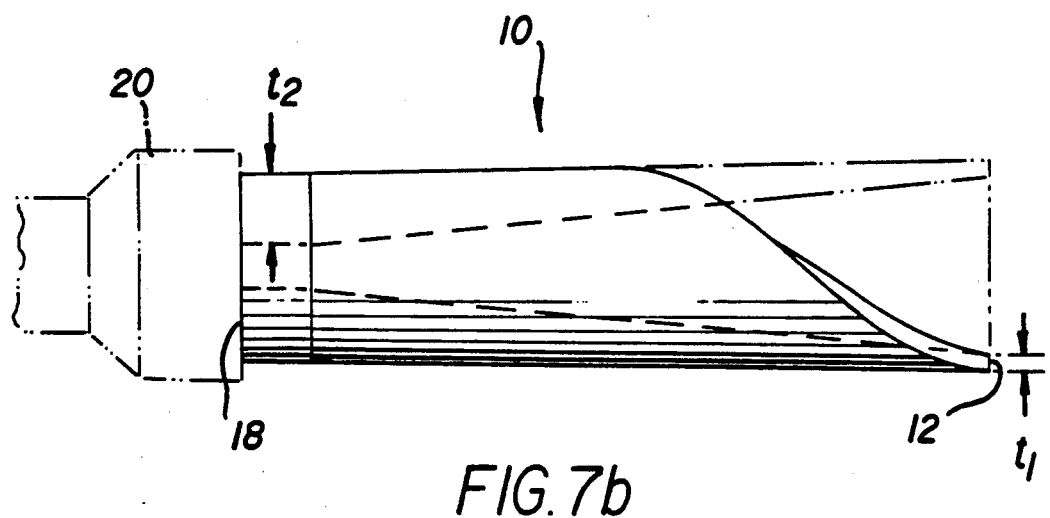

As the thickness taper is increased, it becomes increasingly difficult to form the light collector from a wedge shaped sheet according to the method shown in FIG. 4. To achieve the maximum light collection efficiency benefit a tapered collector as shown in FIGS. 7a and b was designed for injection molding using the injection molding process employed to form canopies for jet aircraft. The light collector 10 shown in top view in FIG. 7a and side view in FIG. 7b has an entrance edge 12, 41 cm long by 1 cm thick ($t_1$). The light collector tapers to a thickness of 2.54 cm ($t_2$) at the exit end 18. The sides of the injection molded light collector are not perfect half circular cylinders, but closely approximate the half circular sides of the light collector shown in FIGS. 1 and 5. The light collectors according to the present invention can also be made by casting plastic resin, or by molding or forming glass or quartz.

INDUSTRIAL APPLICABILITY

The light collectors of the present invention are useful in stimulable phosphor imaging apparatus, and have the advantage of achieving higher light collection efficiency over the light collectors of the prior art.

We claim:

1. A light collector for stimulable phosphor imaging apparatus of the type comprising a sheet of transparent material having a linear input edge for receiving light emitted from a storage phosphor material along a scan line, and an opposite output edge formed into an annular shape for delivering collected light to a photodetector by total internal reflection, characterized by: the sheet of transparent material being of increasing thickness from the linear edge to the annular output edge, such that the number total internal reflections is reduced, thereby increasing the light collection efficiency of the light collector.

2. The light collector claimed in claim 1, wherein the light collector comprises a triangular section, one side of the triangle being the input edge of the light collector, and a pair of one-half circular cylindrical sections adjacent the other two sides of the triangular section, the surfaces of the cylindrical sections being tangent to the surfaces of the triangular section.

3. The light collector claimed in claim 2, wherein the triangular section and the cylindrical sections are of constantly increasing thickness from the light input edge to the annular output edge.

4. A method of forming a light collector for stimulable phosphor imaging apparatus of the type including the steps of clamping one edge of a sheet of thermoplastic material, heating the thermoplastic material until it is pliable, and forming an opposite edge of the sheet into an annular form, characterized by: forming the light collector from a sheet of thermoplastic material having increasing thickness from one edge to an opposite edge on a mold comprising a triangular section, with a pair of one-half circular cylinders along first and second sides of the triangular section, the surfaces of the one-half circular cylinders being tangent to the surface of the triangular section, the sheet of thermoplastic material being clamped with the one edge aligned with the third side of the triangular section, and being formed around the half-cylindrical side sections of the mold, such that there is no stretching deformation of the thermoplastic sheet, and hence no thinning of the thermoplastic sheet whereby the light collector thus formed is of increasing thickness from said one edge to said opposite edge.

* * * * *